April 8, 1969 R. E. BRAUN 3,438,018

APPARATUS AND METHOD FOR MAGNETIC RECORDING

Filed Dec. 23, 1964

INVENTOR
RICHARD E. BRAUN

BY Owen Lamb

AGENT

United States Patent Office 3,438,018
Patented Apr. 8, 1969

3,438,018

APPARATUS AND METHOD FOR MAGNETIC RECORDING

Richard E. Braun, Wappingers Falls, N.Y., assignor to International Business Machines Corporation, Armonk, N.Y., a corporation of New York Filed Dec. 23, 1964, Ser. No. 420,591
Int. Cl. G11b *5/00*
U.S. Cl. 340—174.1 3 Claims

ABSTRACT OF THE DISCLOSURE

A magnetic recording system utilizing a two gap read/write head. The write head precedes the read head in the directions of travel of the tape. A bias coil is provided on the same pole-piece as the conventional write coil and is driven by a high frequency bias current source. The amplitude of the write current bias is just less than that necessary to drive the tape into the saturation region. A write current provided by a write circuit is sufficient when added to the bias current to drive the tape into the saturation region. Because ordinarily in a read/write head the write pole-piece is very close to the read pole-piece the flux produced by the write-head coils induces noise feed-through in the read pole-piece. In this recording system the noise is comprised mainly of the high frequency bias, since the low frequency current from the write circuit is of low amplitude with respect thereto. Feed-through from the high frequency bias is filtered out by a filter leaving only the amplified tape signal induced in the read coil by the tape signal written on tape.

Background of the invention

This invention relates to magnetic recording and reproducing. More particularly, the invention relates to means for reducing the feed-through signal induced in a reproducing transducer by a recording transducer operating in close proximity.

Digital information is stored on a magnetic medium in the form of discrete magnetized areas. The magnetic material is polarized under the influence of a magnetic field which is generated by a magnetic recording head. The flux produced by the head is great enough to cause a saturation of the magnetic material. In this saturation system of recording binary information, the magnetic material is continuously saturated in either a positive or negative direction. Within a given period of time, a change in saturation polarity is called "one" and no-change is called a "0." The process of storing information is called writing and the process of detecting stored information is called reading.

Reading a binary 1 is accomplished by a read head having a pole-piece with an air gap which is placed in the vicinity of the saturated magnetic field. As the magnetic medium is passed over the head, a voltage pulse is induced in a coil wound on the pole-piece whenever there is a change of flux cutting the pole-piece. Thus, when the saturation changes from one direction to another, a voltage pulse is induced. A binary 1 is sensed as a voltage pulse at the terminals of the coil, and the absence of a pulse (no change in flux) indicates a binary 0.

Many magnetic recording systems employ a two-gap head arrangement in which the write pole-piece precedes the read pole-piece in the direction of motion of the magnetic medium. This provides for immediate reading of a newly written record, and eliminates the need for an erase head by allowing the write pole-piece (which may now be wider than the read pole-piece) to write the new information over the old. The read pole-piece will not pick up any unerased information (due to misalignment of the write pole-piece) because the written information is much wider than the read pole-piece.

In order to provide for practically simultaneous writing and reading of information, the write pole-piece must be placed very close to the read pole-piece in the same head assembly. The read pole-piece then permits the reading of a record for checking purposes while the record is being written. Since it takes a relatively large magnitude of current in the write coil to produce enough flux to saturate the magnetic recording medium, a certain amount of the write signal induces a flux in the read pole-piece. This interfering signal is called "feed-through."

A certain amount of signal loss is encountered when a signal is read from the magnetic medium. If a signal is being read in the read head at the same time that a signal is being written in the write head, the feed-through signal in the read head may overpower the low amplitude signal being read, so that it is indistinguishable. The prior art has attempted to reduce the feed-through in various way. For example, a laminated mu-metal shield is placed in the head assembly between the read pole-piece and the write pole-piece. The thickness of this shield is of course limited if it is desired to have both the pole-pieces very close together.

A further shield is necessary outside of the head assembly in a magnetic tape system to reduce the stray magnetic field generated outside the head. This shield requires careful adjustment and has the disadvantage that it cannot come in direct contact with the tape. There must be a small gap remaining for the tape to pass through and this gap allows some of the stray magnetic field from the write pole-piece to induce a flux in the read pole-piece.

Summary

It is therefore a paramount object of this invention to provide an improved magnetic recording and reproducing system.

It is a further object of this invention to provide an improved sensing system for sensing information stored in a storage medium.

More specifically, it is an object of this invention to provide a recording system for recording information on a magnetic surface which has a high signal-to-noise ratio.

It is a further object of this invention to provide a sensing system for sensing information stored on a magnetic surface, which system eliminates signal feed-through from a simultaneous operating recording system.

Briefly, the above objects are accomplished by applying a high-frequency alternating current bias to a switchable magnetic storage medium to maintain a magnetic field which is slightly less than the coercive force of the magnetic medium. Switching of the medium to one state of saturation is accomplished by superimposing a low-amplitude write current field to shift the alternating field into the saturation region of the magnetic medium.

In accordance with one aspect of the invention, the alternating field has an amplitude approximately equal to the coercive force and a frequency well above the highest switching frequency of the superimposed signal field.

In accordance with a further aspect of the invention, the feed-through of the high-frequency bias which may be picked up by a reading station is then filtered out, leaving only the low current write signal in addition to the read signal produced by induction from the magnetic medium.

The invention has the advantage that the feed-through produced by the write current is much less when the alternating current is applied than it would be if a full amplitude write current were necessary to switch the magnetic medium into saturation. The feed-through caused by the high-frequency bias is not a problem because it is filtered during reading.

The invention has the further advantage that magnetic shielding is either not necessary or can be reduced in size because feed-through is substantially reduced.

By using the invention, much less current is needed to record a signal on a magnetic tape, for example, and still obtain the same playback signal with the added advantage that the feed-through is substantially reduced.

The foregoing and other objects, features, and advantages of the invention will be apparent from the following and more particular description of a preferred embodiment of the invention, as illustrated in the accompanying drawings.

In the drawings:

FIG. 1 is a block schematic diagram of a recording and reproducing system employing the invention;

FIGS. 2*a–f* illustrate wave forms taken at various points along the circuit diagram of FIG. 1;

Magnetic recording and reproducing systems utilizing a high-frequency bias are well known in the prior art. However, these systems have been limited to analog and not digital recording. The bias technique has only been used to linearize the recording process and not to perform saturation recording as herein disclosed.

Figure 1:
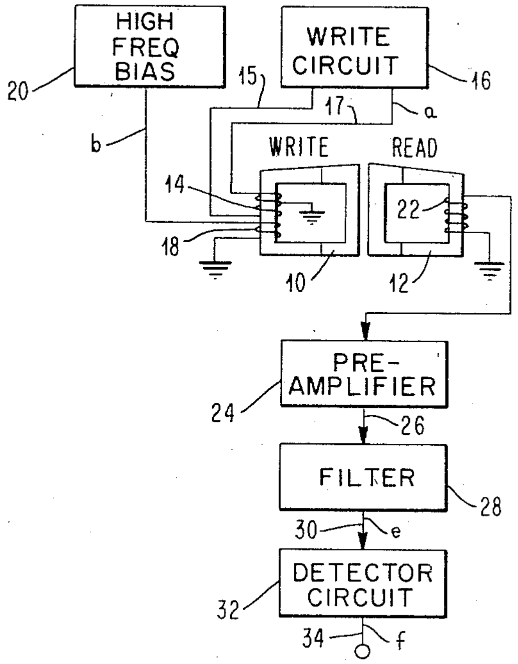

A block diagram of the recording and reproducing system embodying the present invention is shown in FIG. 1. A two-gap read/write head is provided. The write pole-piece 10 precedes the read pole-piece 12 in the direction of travel of the tape. A write coil 14 is provided around the pole-piece 10 and is driven by a write circuit 16. A bias coil 18 is provided in the same pole-piece and is driven by a high-frequency bias current source 20.

A read coil 22 is provided around the pole-piece 12 and the output of the coil is connected to a preamplifier 24. The output 26 of the preamplifier is connected to a filter 28. The output 30 of the filter drives a detector circuit 32. The output 34 of the detector may be connected to any suitable utilization device.

Figure 3:
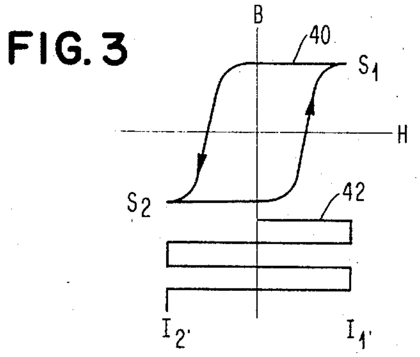
FIG. 3 illustrates a magnetization curve for a magnetic material utilizing saturation magnetic recording by a conventional write circuit of the prior art.

In FIG. 3, the heavy line 40 shows the relationship between the magnetizing force "H" and the resulting magnetic induction "B" for increasing and decreasing values of H. A conventional recording system generates a write current as shown by the curve 42. This current has a maximum value $I_1'$ in one direction for saturating the magnetic material in a first direction of magnetization $S_1$ and a value $I_2'$ in the opposite direction for saturating the magnetic material in the opposite direction of magnetization $S_2$.

Figure 4:
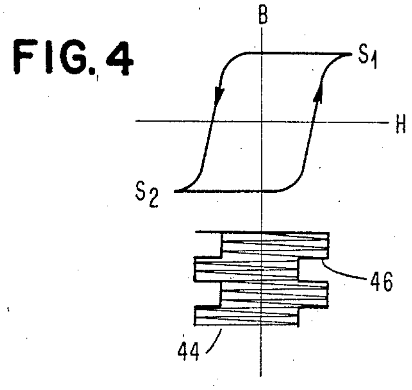
FIG. 4 illustrates a magnetization curve for a magnetic material utilizing the recording apparatus of the present invention.

Referring now to FIG. 4, the B-H magnetization curve for the magnetic medium in the system employing the present invention is shown. A high-frequency bias current 44 produces an alternating flux which is less than that required to drive the magnetizable material into either of the saturation regions $S_1$ or $S_2$. A small write current 46 is superimposed on the alternating current 44 and is of sufficient value in the positive direction to drive the alternating current into the saturation region $S_1$. This small write current, when applied to a negative direction, is sufficient to drive the magnetization material into saturation region $S_2$.

The high-frequency bias current 44 in FIG. 4 is produced by the high-frequency bias circuit 20 in FIG. 1 which is coupled to the write pole-piece 10 by a coil 18. This produces an alternating flux in the pole-piece 10 which is proportional to the alternating current generated by the circuit 20. The write current 46, shown in FIG. 4, is generated by write circuit 16 in FIG. 1. The output 17 produces a positive current through the coil 14 which generates a flux proportional to this current in the pole-piece 10. An equal and opposite current is produced on output line 15. Thus, lines 15 and 17 are complementary and produce positive and negative currents. Since the details of a write circuit to perform this function may be found in Patent No. 3,078,448 of Hugh A. O'Brien entitled "Dual-Channel Sensing," filed July 15, 1957, a more detailed explanation of the write circuitry included in block 16 is unnecessary.

Referring to FIG. 2*a*, the write current pattern for recording the binary number 110110111 is shown. Curve *a* corresponds to the output of the write circuit 16 which includes a proportional flux in the write pole-piece 10.

The output of high-frequency bias circuit 20 is shown in FIG. 2*b*. Since the coils 14 and 18 are wrapped around a common pole-piece 10, the flux produced in that pole-piece will be proportional to the sum of the two curves *a* and *b* as shown in FIG. 2*c*. To write the first one on tape, the write current is switched from $I_2$ to $I_1$. This shifts the AC bias shown in curve *b* into the saturation region $S_1$ shown in curve *c*. To write the following 1, the write current is shifted from $I_1$ to $I_2$, which is equal and opposite in direction to $I_1$. This causes the high-frequency bias to be shifted into the saturation region $S_2$ where it remains until the next 1 is written. The next binary digit to be written is a 0, and therefore, the write current in curve *a* remains in the negative direction, $I_2$. The fourth digit is a binary 1 and is written by shifting the write current from $I_2$ to $I_1$ which again shifts the high-frequency bias from the negative saturation region $S_2$ into the positive saturation region $S_1$.

Thus, every time a 1 is written, the direction of magnetization of the tape shifts from saturation region $S_1$ to saturation region $S_2$, or vice-versa. By looking at curve *c*, it should be noted that the tape is never driven out of saturation by the AC bias alone. When the tape is in the saturation region $S_1$ the negative excursion of the AC bias is insufficient to drive the tape into the saturation region $S_2$. The signal recorded on tape will be proportional and similar to the curve for the write current shown in curve *a*.

Figure 2:
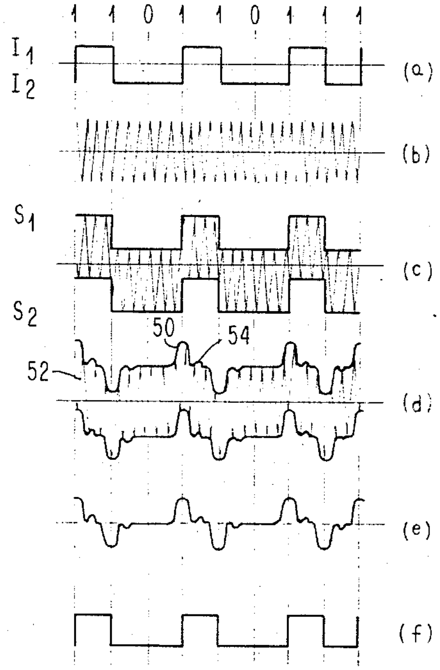

The read signal induced in coil 22 is shown in curve *d* of FIG. 2. This curve includes the flux induced in the pole-piece 12 as the tape passes thereover. This component of the signal is similar to that shown in curve *e* and is shown by the curve 50 of the composite waveshape in FIG. 2*d*. However, because the write pole-piece 10 is very close to read pole-piece 12, the flux produced by the write current coils 14 and 18 induces a flux in the read pole-piece 12. This flux follows substantially the curve of FIG. 2*c*. It is comprised mainly of the AC high-frequency bias and the DC low-amplitude write circuit current. This high-frequency bias feed-through is illustrated by the curve 52 in FIG. 2*d*, and the write circuit current feedthrough is illustrated by the small glitches 54.

The signal induced in the coil 22 is amplified in preamplifier 24, the output of which is connected to a filter 28 by output line 26. The filter 28 is designed to reject the frequency contributed by the high-frequency bias feed-through but to accept all other frequencies. Since this frequency is chosen to be higher than the highest write circuit frequency (curve *a*), substantially all of the low frequency tape signal shown in curve *a* is admitted through the filter 28.

The tape signal shown in FIG. 2*e* may be detected by any suitable sensing circuit 32. For example, that shown in Patent 2,961,642 of O. L. Lamb, entitled "Peak Sensing Circuit," filed Dec. 31, 1957. By using this type of circuit, the peaks of the waveform *e* generate a waveform *f* which is substantially identical to the curve *a* representing the binary number which was recorded.

Figure 5:
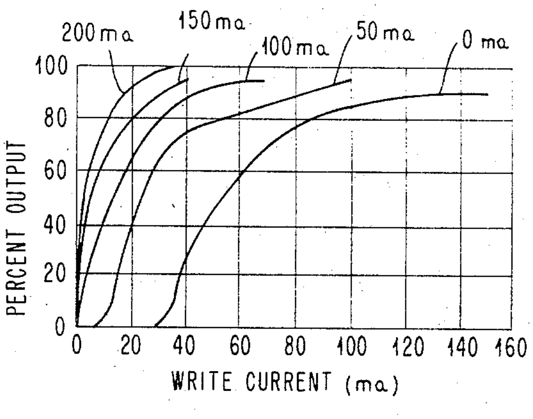
FIG. 5 illustrates the saturation characteristics of a magnetic material taken at various amplitudes of alternating current bias.

The results obtained by using the present invention are illustrated in FIG. 5, which is a plot of the write current versus percent output of the playback signal to obtain the saturation characteristics at various high-frequency bias. The bit density is 100 bits per inch with a square wave write current, the maximum frequency of which does not exceed 8 kc. The bias frequency should be at least five times the recording frequency, and here is 40 kc. For 0 bias, it is seen that it takes approximately 150 ma. of write current to fully saturate the tape, whereas, for a large bias current of approximately 200 ma., only 50 ma. of write current are necessary to fully saturate the tape. Thus, the feed-through is reduced to approximately one-third the value it has when no AC bias is used.

The invention has been described in connection with magnetic tape recording devices, but the benefits of the invention can be enjoyed when utilizing other similar recording systems; for example, magnetic drums, magnetic discs, magnetic cores, wire-recording systems, etc.

While the invention has been particularly shown and described with reference to a preferred embodiment thereof, it will be understood by those skilled in the art that various changes in form and detail may be made therein without departing from the spirit and scope of the invention.

What is claimed is:

1. In a saturation magnetic recording system, the combination comprising:

a magnetic recording medium;

means for applying a high-frequency alternating magnetic field in coaction with said medium, the amplitude of said field being less than that necessary to drive said magnetic medium into saturation;

means for superimposing a magnetic field on said alternating field, said superimposed field being of sufficient amplitude when combined with said alternating field to drive said magnetic medium into saturation;

means for switching the polarity of said superimposed field from a first polarity to a second polarity to thereby cause saturation of said magnetic medium in a first and second direction of magnetization respectively; and detection means coacting with said medium and in proximity with said alternating magnetic field for generating an electric current in response to a change in the direction of saturation magnetization of said medium, said detection means including a band rejection filter for rejecting high-frequency alternating current feed-through, induced by said proximate alternating magnetic field.

2. In a saturation magnetic recording system in which a flux producing first transducer for recording on a magnetic medium and a change-in-flux detecting second transducer for detecting the recorded signals are located in close proximity, apparatus for reducing interfering signals induced in the second transducer by the first transducer, comprising:

means for inducing a high-frequency alternating magnetic field in the first transducer which is insufficient to cause saturation of said magnetic medium;

means for inducing a further magnetic field in the first transducer to shift the alternating field into the saturation region of the medium, including means for changing the saturation from one polarity to the opposite polarity; and detection means in the second transducer for filtering out any induced high-frequency feed-through signal from the first transducer and for detecting a signal produced by induction from the magnetic medium caused by a change from saturation of one polarity to saturation of the opposite polarity.

3. In a saturation magnetic recording system in which a magnetic recording surface is translated past a recording head having a write pole-piece for recording data on said surface and a read pole-piece situated in close proximity with said write pole-piece so as to read the recorded data immediately after it is written, apparatus for reducing interfering signals induced in the read pole-piece by the write pole-piece comprising:

means for inducing a high-frequency alternating bias magnetic field in the write pole-piece, the amplitude of said field being less than that necessary to drive the magnetic surface into saturation;

means for superimposing a magnetic field on said alternating field, said superimposed field being of sufficient amplitude when combined with said alternating field to drive the magnetic surface into saturation;

means for switching the polarity of said superimposed field from a first polarity to a second polarity to thereby cause saturation of the magnetic surface in a first and second direction of magnetization respectively; and detection means in combination with the read pole-piece for generating an electric current in response to a magnetic field in the read pole-piece induced by a change in the direction of magnetization, said detection means including a band rejection filter for rejecting high-frequency alternating current feed-through generated by an alternating magnetic field induced in said read pole-piece by said alternating bias field.

References Cited

UNITED STATES PATENTS

| | | | |
|---|---|---|---|
| 2,887,674 | 5/1959 | Greene | 340—174.1 |
| 3,012,234 | 12/1961 | Burns | 340—174.1 |
| 3,243,520 | 3/1966 | Martin | 340—174.1 |
| 3,228,016 | 1/1966 | Hopner | 340—174.1 |

BERNARD KONICK, *Primary Examiner.*

V. P. CANNEY, *Assistant Examiner.*